INVENTORS R. C. CASTERLINE
L. F. GOELLER, JR.
J. M. NERVIK

BY James W. Falk

ATTORNEY

TRUNK SWITCHING CIRCUITRY

Filed June 9, 1964 2 Sheets-Sheet 2

United States Patent Office 3,336,442

Patented Aug. 15, 1967

3,336,442

TRUNK SWITCHING CIRCUITRY

Russell C. Casterline, Lincroft, and Leopold F. Goeller, Jr., Hazlet, N.J., and John M. Nervik, Bethesda, Md., assignors to Bell Telephone Laboratories, Incorporated, New York, N.Y., a corporation of New York Filed June 9, 1964, Ser. No. 373,696

33 Claims. (Cl. 179—18)

ABSTRACT OF THE DISCLOSURE

An electronic telephone system is disclosed employing a program controlled data processor for controlling and supervising the establishment, maintenance and release of call connections from telephone stations through line and trunk link networks and trunk circuits. Scanner and pulse distributor facilities are activated by the data processor to control the selective connection of digit transmitters, receivers and test equipment to an input termination of a trunk circuit in the link network. The facilities also operate the trunk circuit to establish electrical networks including a direct current network from the input termination of the trunk circuit to an interoffice trunk.

This invention relates to trunk switching equipment for communication systems and particularly to equipment for telephone systems which reduces the cost and complexity of trunk circuits by virtually eliminating the need for supervisory and switching control apparatus in such circuits. Our invention further relates to a trunk switching circuit which is selectively switched to provide a plurality of distinct electric transmission networks between a trunk and a switching link in response to instructions from a program controlled data processor.

Developments in the switching art have progressed in recent years to the extent that at present high speed electronic data processors are utilized in telephone systems as time-shared common control equipment which executes a substantial precentage of the memory, translation, instruction and other control operations previously performed on an individual basis by relatively slow speed noncommon control switching circuits. Such progress has advantageously resulted in substantial reductions in the complexity and cost of such noncommon control circuits and has made faster, more versatile telephone service available to customers.

Despite such progress and persistent development effort, however, it has heretofore been impractical to centralize many of the supervisory and switching control operations of noncommon control trunk circuits in high speed, time-shared common control equipment. As a consequence, it has been a customary practice to equip each trunk circuit of a telephone system with complicated and costly apparatus for connecting, supervising and other control operations associated with the serving of calls.

Prior art trunk circuits have proven somewhat further complicated by the need for furnishing each of them with separate "talking," "signaling" and "testing" line appearances in a telephone office. The "talking" appearance of such a circuit is usually in the telephone switching network which has access to customer lines or trunks. A "signaling" appearance is customarily in a special connector circuit which has access to data transmitters or receivers. The latter appearance is utilized so that a transmitter or receiver can be connected to an associated interoffice trunk to send or receive call data without having bridged thereto the transmission networks which are associted with a "talking" appearance and which may adversely affect the data transmission or reception. The "testing" appearance is normally in a specially test connector circuit which connects equipment thereto for performing routine preventative maintenance and trouble measurements.

In addition, such prior art circuits are generally equipped with costly supervisory relays which are individually associated with the "talking" appearance and the interoffice trunk to detect such supervisory signals as called party answer signals and disconnect signals from the calling and called stations. Moreover, such supervisory relays ordinarily control other relays which connect, maintain and release call connections between the trunk and the separate "talking," "signaling" and "testing" appearances.

In view of the foregoing, it is apparent that a need exists for facilities which reduce the cost and complexity of trunking equipment and particularly which minimizes the need for the separate "talking," "signaling" and "testing" appearances of trunk circuits and the associated special connector circuits, as well as the supervisory and switching control devices of individual trunk circuits.

Accordingly, it is an object of our invention to reduce the cost of trunking equipment of communication switching systems and specifically to simplify trunk circuits of telephone systems, while at the same time enabling them to furnish fast, high quality communication service to customers.

It is another object to reduce the amount of apparatus customarily utilized in individual trunk circuits for the control and supervision of telephone connections and particularly to centralize the performance of such functions in high speed common control equipment.

Another object is to eliminate the need for separate "talking," "signaling" and "testing" line appearances for trunk circuits of a telephone system.

These and other objects are attained in accordance with a specific exemplary embodiment of our invention wherein simple and economical trunk circuits are provided by centralizing the control and supervision over the establishment, maintenance and release of call connections through such circuits in a high speed program controlled data processor of an electronic switching system (ESS). According to our invention, each circuit is equipped with a single appearance in a telephone switching network and with magnetically latching relays which are activated over control leads by programmed instructions from the data processor for establishing either purely metallic connections between the appearance and an interoffice trunk, or connections therebetween comprising distinct combinations of electrical transmission devices. The single appearance is selectively utilized for signaling, talking and testing. It is selectively connectable through the telephone switching network to customer lines or trunks, to data transmitters or receivers, and to test equipment without the need for special connector circuits.

The trunk circuit simplicity and economy is achieved because only the transmission devices and a minimal amount of switching apparatus is needed in each such circuit for establishing the aforementioned connections between the switching network appearance and a trunk. Moreover, the trunk circuits are simple and economical because the apparatus conventionally supplied in prior art trunk circuits for controlling and supervising the establishment, maintenance and release of call connections has been virtually eliminated from the trunk circuits in accordance with our invention.

In accordance with the present invention, each trunk circuit is connected to an individual appearance in the switching network by means of a first pair of conductors and is connected to an individual trunk over a second pair of conductors. These pairs of conductors are selectively interconnected during various phases in the establishment of a telephone call by either purely metallic connections or connections through the transmission devices which comprise selectable network combinations of transformers, inductors, capacitors and resistors.

All of the connections between the first and second pairs of conductors are established under control of three magnetically latching relays. Each of these relays has its operate winding connected over an individual lead to a signal distributor which acts as a buffer circuit between the high speed electronic program controlled data processor and the relatively slow speed relays. The distributor receives instructions, or commands, from the data processor one at a time and then applies an appropriate electrical pulse to a selected one of the leads for operating the associated one of the latching relays to establish either the metallic connections or the transmission network connections between the first and second pairs of conductors. In operating, a latching relay actuates its contacts to establish the desired connections between the first and second conductor pairs and also magnetically latches, or locks, operated until a release pulse is subsequently received over the associated lead from the distributor. Such a release pulse is applied to the lead in response to an instruction from the data processor. An advantage of employing such relays in trunk circuits is that they require no "hold" current to remain operated during the desired phases of a telephone call and, accordingly, lessen the steady state current drain from the power supply equipment. In the exemplary embodiment, the three relays are operated or released one at a time and provide eight distinct switching states for serving tandem and local customer calls.

Each trunk circuit is also equipped with two pairs of scan leads, or points, each pair of which is associated with an individual Ferrod sensor device in a scanner circuit and is selectively connectable by means of contacts of the magnetically latching relays to both the trunk and the trunk circuit appearance in the switching network. The Ferrods are current sensitive devices which are utilized primarily for monitoring supervisory signals received over the first and second conductor pairs of the trunk circuit. These devices are periodically scanned by the scanner circuit under instructions received from the data processor to read-out supervisory signals received on the scan leads. Ferrods are further disclosed in J. A. Baldwin, Jr.-H. F. May application Ser. No. 26,758, filed May 4, 1960.

Certain structural aspects of an exemplary outgoing trunk circuit in accordance with our invention may be understood by explaining at this time the order in which various connections between the first and second conductor pairs are established under control of programmed instructions from the data processor. After an outgoing call has been introduced into the electronic telephone system and the called number information has been transmitted to the data processor, the processor locates an idle outgoing trunk circuit and a transmitter for serving the call. The processor then instructs the switching network to interconnect the transmitter to the first conductor pair of the trunk circuit and shortly thereafter instructs the signal distributor to switch the selected trunk circuit from its IDLE state into a so-called BYPASS state by activating a first one of the latching relays to establish purely metallic connections between the first and second conductor pair through contacts of that relay. The term BYPASS is used to define this state of the trunk circuit because the metallic connections between the first and second conductor pairs bypass all of the transmission networks therein. Subsequently, when the distant telephone office is prepared for receiving data, the processor instructs a central pulse distributor to control the transmitter in such a manner as to transmit over the established connections through the trunk circuit the data needed for completing connections to the called station.

Following the data transmission, the processor, in accordance with the programmed instructions, commands the signal distributor to switch the trunk circuit from its BYPASS state to its HOLD state by operating a second latching relay and then releasing the first relay. In the HOLD state, contacts of the second relay serially connect one of the aforementioned Ferrods, a diode and the winding of an inductor between the second conductor pair of the trunk circuit to provide a low resistance termination for holding the usual switch connections at the other end of the trunk. While the trunk circuit is in its HOLD state, the processor instructs the switching network to release the transmitter from the first conductor pair and thereafter to connect that conductor pair to the calling circuit.

Before explaining other aspects of the trunk circuit, it is advisable at this point to explain that the trunk circuit of this invention is designed to provide different "talk" transmission facilities for calls originating at local customer stations served by the switching system ESS and for tandem calls incoming to the system from distant telephone offices. Furthermore, the trunk circuit is designed to provide different "talk" transmission facilities for tandem calls originating at distant customer stations and at remote operator positions. Thus, the trunk circuit has three different "talk" transmission states identified as TALK LOCAL, TANDEM I and TANDEM II.

Considering first the TALK LOCAL state, it is noted that a local calling customer line will be connected to the first conductor pair of the trunk circuit while the trunk circuit is in its HOLD state. Shortly afterwards, the processor instructs the signal distributor to activate the third latching relay to switch the circuit from is HOLD to its TALK LOCAL state. In the latter state, the aforementioned Ferrod device, diode and inductor remain serially connected with the trunk to monitor initially for the called party answer signal and subsequently for the called party disconnect signal at the end of the call. In addition, the contacts of the operated second and third relays connect a repeating coil transformer, a pair of capacitors and a "return loss" transformer between the first and second conductor pairs of the trunk circuit to provide an alternating current transmission path therebetween. The "return loss" transformer is employed to optimize return losses due to varying lengths and resistances of customer lines. At the same time, talking potentials for the calling telephone are supplied to the first conductor pair of the trunk circuit via a second Ferrod sensor in the scanner circuit and the scanner leads, another inductor, the "return loss" transformer windings, and contacts of the latching relays in the trunk circuit. The latter Ferrod then supervises call connections toward the caller and senses when the calling party disconnects at the end of the call.

Turning now to the TANDEM I state, it is noted that an incoming trunk circuit will be connected to the first conductor pair of the trunk circuit while that circuit is in its HOLD state. Afterwards, the processor instructs the signal distributor to switch the trunk circuit sequentially from its HOLD state through its TALK LOCAL state to its TANDEM I state. The change between the TALK LOCAL and the TANDEM I state is effected when the distributor causes the release of the second latching relay. The release of the latter relay short-circuits the windings of the "return loss" transformer and disconnects the talking potentials and the second Ferrod from the first conductor pair. Aside from these structural changes, the transmission network between the first and second conductor pairs of the trunk circuit is the same as for the aforementioned TALK-LOCAL state. The talking potentials for the caller telephone and the supervision of the calling party disconnect are supplied in a trunk circuit of the originating telephone office.

On a tandem call from an operator switchboard, an incoming trunk circuit of the electronic switching system is connected to the first conductor pair while the outgoing trunk circuit is in its HOLD state. Thereafter, the processor instructs the signal distributor to switch the trunk circuit from its HOLD state through its TALK LOCAL state to its TANDEM II state. The latter state is established by sequentially operating all of the latching relays. In the TANDEM II state, the first and second conductor pairs of the trunk circuit are interconnected by metallic connections comprising wires and contacts of the latching relays and the only bridging impedances across these conductors consist of a Ferrod, a pair of polarized diodes and an inductor. This bridging impedance is sufficiently high so as not to seriously impair voice communication and is utilized for coupling the Ferrod to the call connections which Ferrod is utilized for supervising and sensing the called party answer and disconnect signals received over the trunk.

A feature of our invention is the provision of a trunk circuit having a communication path terminated in a switching network and apparatus activated in response to programmed instructions from common control equipment for sequentially establishing a plurality of distinct electrical transmission networks between that path and a communication trunk.

A feature of the present invention is the provision of trunk circuits each of which comprises apparatus operable for establishing local customer call connections and devices operable for selectively establishing different communication connections for a plurality of different tandem calls, and common control equipment for supplying programmed instructions for selectively operating the trunk circuit apparatus and devices.

Another feature is the provision of a trunk circuit comprising first and second communication paths, an electrical impedance network connectable between the paths for transmitting alternating current signals therebetween, and switching means responsive to the receipt of a control signal for establishing direct current connections between the paths which connections bypass the impedance network.

A further feature, directly related to the immediately previous one, is the provision in the switching means of apparatus for disconnecting the impedance network from the communication paths while the direct current connections are established, and apparatus for establishing purely metallic direct current connections between the paths.

Another feature is the provision of a trunk circuit having a single appearance in a telephone switching network which selectively connects that appearance to a transmitter, a calling circuit and a test circuit under control of programmed instructions from common control equipment, as well as the provision of apparatus in the trunk circuit for establishing communication connections from that appearance to an outgoing trunk.

Another feature is the provision of a trunk circuit comprising a plurality of magnetically latching relays which are activated by electrical pulse signals received over control leads from common control equipment to establish either purely metallic connections between first and second pairs of communication conductors or connections therebetween by means of selectable configurations of transformers, capacitors, inductors and resistors.

Another feature is the provision of a trunk circuit having first and second pairs of communication conductors, a plurality of scan leads connected to common control equipment, magnetically latching relays activating in response to programmed instructions from the common control equipment for connecting the scan leads to the first and second conductor pairs to transfer supervisory signals therefrom to the equipment, and the latching relays being controllable in response to the receipt of the supervisory signals for interconnecting the first and second conductor pairs.

Yet another feature, which is related to the preceding one, is the provision of Ferrod sensor devices that are connectable to first and second conductor pairs by the latching relays for monitoring supervisory signals received over those conductor pairs.

It is another feature that a trunk circuit according to our invention comprises first and second pairs of trunking conductors, a pair of capacitors each one being individually connectable to one conductor of one of the pairs of conductors, a transformer having first and second two-terminal windings, one of the terminals of each of the windings being connected to one of the capacitors and the other one of the terminals of each of the windings being connectable individually to the other conductor of one of the pairs of conductors, and switching means responsive to the receipt of electrical signals for selectively bypassing the capacitors and transformer windings with purely metallic connections between the pairs of conductors.

Another feature is the provision in a trunk circuit of a "return-loss" transformer having a pair of windings each of which is connectable in series with one conductor of a two-conductor communication path through the circuit for increasing return losses over the path, and switching apparatus activated by electrical signals from common control equipment for serially connecting these windings with the conductors.

A feature of the present invention is the provision of a switching system having a switching network operable for establishing communication connections, a trunk circuit having a first pair of conductors connected to the network and a second pair of conductors connectable to a trunk, a digit transmitter, control equipment for operating the network to connect the transmitter to the first conductor pair for transmitting digits thereto, connector apparatus in the trunk circuit activated by an electrical signal from the control equipment for establishing metallic connections from the first to the second pair of conductors to transmit the digits to the trunk, and apparatus in the trunk circuit activated by the control equipment after the diigt transmission for releasing the metallic connections and connecting an electrical impedance network between the first and second conductor pairs.

Another feature, related to the preceding one, is the provision of test equipment having a termination in said switching network and facilities in the control equipment for selectively operating the network to connect that termination to the first conductor pair of the trunk circuit and also activating the apparatus in the trunk circuit for establishing metallic connections from the first to the second conductor pairs and thereby to enable the test equipment to be connected directly to the trunk.

The foregoing objects, features and advantages, as well as others, of this invention may become more apparent from a reading of the following description with reference to the drawings in which.

Figures 2, 2A:
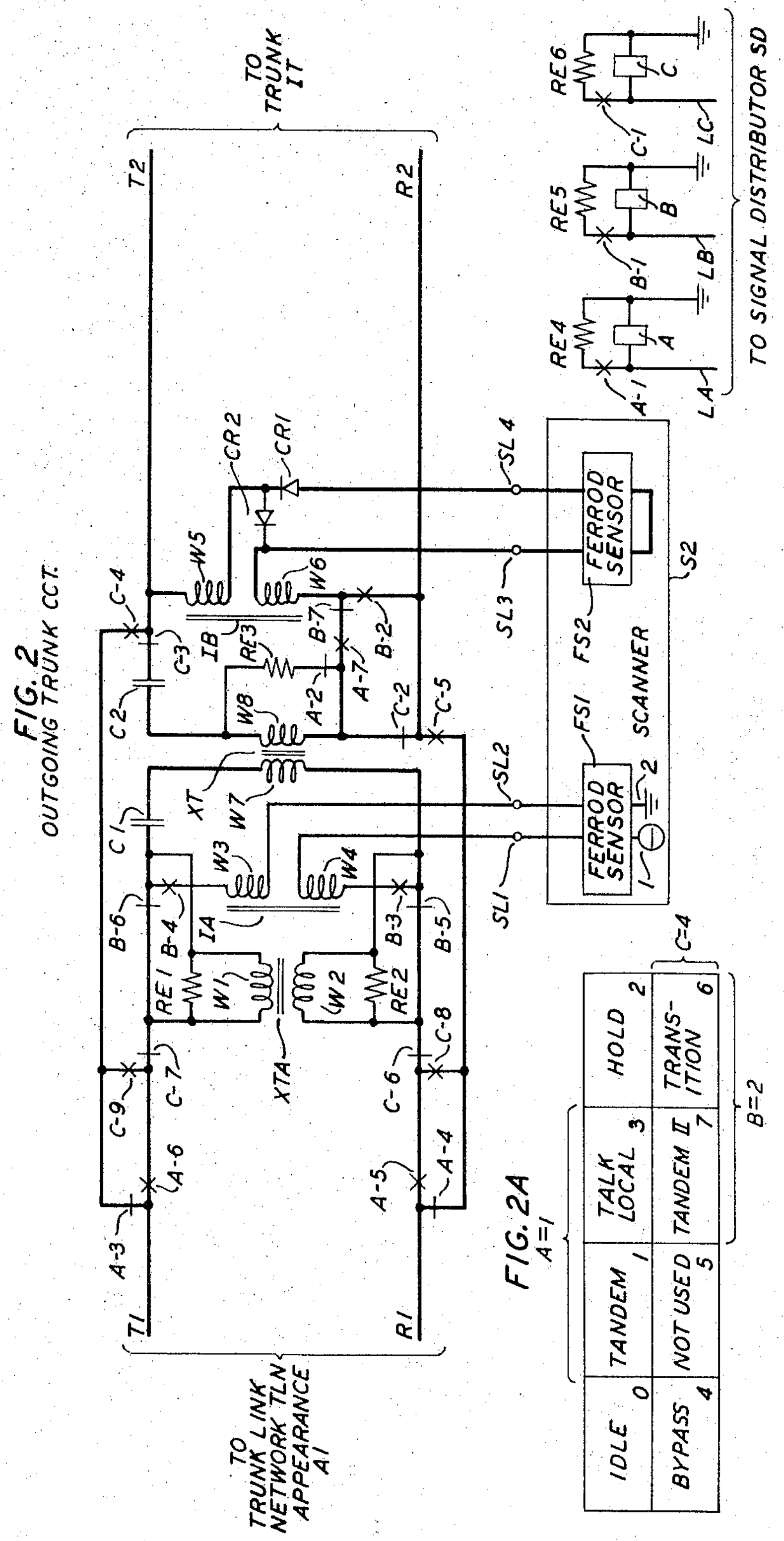
FIG. 2 shows schematically the illustrative outgoing trunk circuit.
FIG. 2A shows a "state" diagram for the various switching states into which the outgoing trunk circuit may be switched during the servicing of local and tandem telephone calls.

It is noted that FIG. 2 employs a type of schematic notation for relays. This notation is referred to as "detached-contact" in which an "X" crossing the line represents a normally opened contact of a relay and a bar crossing a line represents a normally closed contact of a relay; "normally" referring to the nonoperated, or released, state of a relay. The other relay components including its windings are represented by a rectangular symbol. The principles of this type of notation are described in an article entitled "An Improved Detached Contact-Type of Schematic Circuit Drawing," by F. T. Meyer in the September 1955 publication of the American Institute of Electrical Engineers Transactions, Communications and Electronics No. 20, vol. 74, pages 505–513.

Each relay contact is designated in the drawing in a manner which indicates the relay of which it is part and, as well, uniquely identifies it with respect to the other contacts of the same relay. For example, referring to the contact A–1 shown in the lower right side of FIG. 2, it is noted that the "A" portion of the designation indicates that it is controlled by the A relay of FIG. 2 and the "–1" uniquely identifies it with respect to another contact A–3 of relay A, the latter contact being shown at the upper left side of FIG. 2.

The equipment illustrative of the principles of the present invention has been designed for incorporation, by way of example, into an electronic program controlled telephone system of the type disclosed in the copending A. H. Doblmaier et al. patent application Ser. No. 334,875, filed Dec. 31, 1963. It is particularly concerned with the outgoing trunk circuit and its associated equipment depicted by the heavy lined block in FIG. 1. The other equipment elements are neither shown nor described in detail herein, except where necessary for a complete understanding of the invention. The cited Doblmaier et al. disclosure and the patent applications referred to therein may be consulted for a complete understanding of the construction and operation of the scanners S1 and S2, signal distributor SD and the other elements not described in detail herein. While certain of the circuit details of the line and trunk link networks LLN and TLN are set forth in the Doblmaier et al. disclosure, more detailed specifications of these networks are presented in the following copending patent applications: T. N. Lowry Ser. No. 205,920, filed June 28, 1962; now Patent 3,231,678 issued Jan. 25, 1966; A. Feiner Ser. No. 253,083, filed Jan. 22, 1963 now Patent 3,257,513 issued June 21, 1966; and K. S. Dunlap-A. Feiner-R. W. Ketchledge-H. F. May Ser. No. 295,458, filed July 16, 1963 now Patent 3,281,539 issued Oct. 25, 1966.

*General description*

The organization of the principal equipment units of the illustrative embodiment of our invention will now be described with reference to FIG. 1. The electronic switching office is designed to serve many types of telephone calls including outgoing calls from local customer stations and tandem calls from both other telephone offices and switchboards. An outgoing call from a local customer station, such as one of the stations TS1–TSN, is a call that is initiated by a customer served by the electronic switching office and is terminated via another telephone office, such as the terminating office TO. A tandem call is one which originates in either an originating telephone office, such as office OR, or at an operator switchboard, such as switchboard SB and which is switched through the electronic switching office to a terminating office. Such calls are deemed to be the best types for explaining and obtaining a full understanding of the features of the present invention.

The stations TS1–TSN are connected to the electronic switching office over the telephone lines L1–LN and are terminated in both a line scanner S1 and the line link network LLN. The scanner S1 is employed for sensing "on-hook" and "off-hook" signals representing calling requests for service on the lines L1–LN.

The originating office OR and the switchboard SB are connected via the trunks ORT and SBT and incoming trunk circuits ITC1 and ITC2 to both the scanner S2 and the trunk link network TLN. The scanner S2 is employed for sensing "on-hook" and "off-hook" signals representing supervisory switching commands and calling requests for service from the office OR and switchboard SB.

The network LLN comprises switching facilities for establishing communication connections from the lines L1–LN to the trunk line network TLN via network wire junctors J. Similarly, the network TLN includes switching facilities for establishing communication connections from the junctors J and the incoming trunk circuits ITC1 and ITC2 to digit receivers and dial tone supplies such as receiver DR and supply DTS, as well as to trunk circuits such as circuit TC which is used for serving outgoing local and tandem calls to the office TO. In addition, the network TLN is advantageously used as a trunk circuit-to-transmitter connector for establishing connections from an outgoing trunk circuit, such as circuit TC, via the wire junctors WJ to the digit transmitters, such as the transmitter DT. These connections are used for outpulsing digital information needed by the office TO to complete call connections. An advantage obtained from this use of network TLN is that it establishes the call communication paths, as well as the signaling and supervisory paths required for the control of switching apparatus in office TO. Another advantage is that additional and special connector equipment is not required as in prior art systems. In addition, the network TLN provides connections under programmed instructions between any of the system trunk circuits and data transmitters or receivers. This system configuration provides for flexibility in changing type of pulsing through a trunk circuit without wiring change as heretofore required in prior art systems. The type of pulsing via any trunk circuit can be altered by a simple program change since any data transmitter or receiver in the system can be used with any trunk circuit being dependent only on a translation option within central processor CP.

The network TLN also furnishes connections between the test equipment TE and the network appearance of any one of the trunk circuits of the system in response to programmed instructions from the central processor CP. Such connections are used for conducting routine preventive maintenance and trouble measurements such as, false cross and ground measurements, as well as continuity and polarity measurements.

Unlike prior art trunk circuits, the individual incoming and outgoing trunk circuits of the systems have a single appearance, such as appearance A1, presently disclosed in the trunk link network TLN which is used for talking, signaling and testing. In addition, these trunk circuits have no individual line supervisory relays for monitoring "on-hook" and "off-hook" conditions on the lines L1–LN and the trunks ORT, SBT and IT during the local and tandem calls. Similarly, the digit receivers do not comprise any digit registers as have heretofore been employed in similar prior art circuits. Instead, the trunk circuits, digit receivers and transmitters are provided with a plurality of scan points, such as points SP of trunk circuit TC to which are applied the appropriate "on-hook," "off-hook" and digit signals. These scan points are connected to the scanner S2, which senses the applied signals for subsequent use by a central processor CP.

In accordance with the Doblmaier et al. disclosure, a vast majority of the logic, control, storage, supervision and translation functions required for the operation of the trunk circuits, digit receivers and transmitters, as well as the other circuits of the electronic switching office are performed by common control equipment comprising the central processor CP. Accordingly, a minimal amount of control circuitry is needed in the individual trunk circuits, receivers and transmitters and only essential transmission apparatus and switching devices are included therein. These switching devices, in most instances, comprise magnetically latching relays (for example the relays A, B and C of FIG. 2) which are connected to a signal distributor SD. This distributor acts as a buffer between the high speed central processor CP and the relatively slow speed relays to provide for the operation of the relays whereby the circuits are switched into the different functional states required for serving local and tandem calls. Distributor SD causes the operation and the subsequent release of the latching relays upon the receipt of programmed instructions from the central processor CP.

Communications between the signal distributor SD, the scanner S1 and S2, the central processor CP and the central pulse distributor CPD of the system are by way of bus systems and multiconductor cables which provide discrete communication paths between selected ones of the circuits. These bus systems and cables are described in Doblmaier et al. and are represented herein by the bus systems and cables BSC.

As set forth in Doblmaier et al., the central processor CP is a centralized data processing facility which is employed to implement the varied telephone administrative and maintenance functions of the switching system. It is divided functionally into three units comprising a call store CS, program store PS and a central control CC. The call store CS is a temporary or erasable memory facility which employs apparatus for storing information pertaining to calls in progress. Such information includes: (1) the busy-idle status of communication paths through the line and trunk line networks LLN and TLN, (2) the digits received from a digit receiver DPR, (3) the digits required to be outpulsed by a transmitter DT for completing the call, and (4) the charging information to be recorded by the automatic message accounting equipment AMA for billing purposes.

The program store PS is a semipermanent memory facility which is employed to store the less changing system information including the system programs and a variety of translation information, such as the directory number-to-line equipment location data. Translation facilities are also furnished in the program store PS for deriving semipermanent information for routing, charging, ringing, and the like on telephone calls.

The central control CC is the primary information processing unit of the system. It is capable of executing one at a time many different types of basic instructions, or orders, required for controlling the line and trunk link networks, trunk circuits, digit receivers and transmitters during calls. These instructions are written in the form of programs which are stored in the program store PS. The programming instructions are the vocabulary of the machine used to inform the switching circuits of the system how and when to perform their various functions. The central control CC requests an instruction from the program store PS every few microseconds and upon receiving it executes, or commands, the appropriate circuit or circuits to carry out the proper functions. Accordingly, the central control CC is the hub of the system which originates all addresses and commands to other circuits and receives back all answers from the controlled circuits. It is important to note, however, that the central control CC is capable only of executing individual instructions and that the mechanized intelligence required to supply the instructions needed for the complex telephone functions of the system resides entirely in the stored programs.

The central pulse distributor CPD is utilized to provide the central control CC with fast access to many control points of the functional switching circuits of the office. Upon receiving an order from the central control CC, the distributor CPD selects and applies pulses to one of several hundred of the control points. For example, the distributor CPD is arranged to supply periodically recurring pulses over the lead PL to the transmitter DT for outpulsing information via the trunk circuit TC to the office TO while call connections are being established for a call.

Turning now to the manner in which an outgoing local call is served by the electronic switching system, it is initially assumed that a customer at station TS1 initiates a call to station CTS. This type of call is referred to as a local customer call as distinguished from the tandem I and II types of calls which originate from the office OR and the switchboard SB. When the caller removes the telephone handset from its cradle, an "off-hook" signal is sensed in the scanner S1 as set forth in the Doblmaier et al. disclosure. Subsequently, the central control CC in executing a line scanning operation interrogates the scanner S1 and reads-out the stored "off-hook" condition. It then consults the busy-idle information stored in the call store CS for each line to insure that the "off-hook" condition has not been previously observed. Upon ascertaining that the line L1 was previously "on-hook," the central control CC concludes that a call origination has occurred and it "updates" the busy-idle information for line L1 in the store CS. The central control CC knows the scanner address of line L1 and uses it to refer to a translation area of the program store PS which provides it with all of the service information it needs concerning line L1. Such information includes data pertaining to whether the line is an individual or a party line and whether the associated telephone transmits dial pulses or TOUCH-TONE signals.

The central control CC then selects an idle digit receiver DR and the associated dial tone supply DTS for use on the call. Next, the control CC ascertains the availability of an idle path from line L1 through the networks LLN and TLN to the receiver DR by consulting the busy-idle information stored in the call store CS for all paths through the link networks. Upon finding such a path, the control CC sends orders to the networks LLN and TLN to establish the appropriate switching connections. Thereafter, the scanner S1 is disconnected from line L1 when the network LLN opens the cut-off contacts CA and thereby avoids any transmission degradations over line L1 due to the scanner circuitry. The central control CC then requests the signal distributor SD to operate apparatus in the receiver DR for causing dial tone to be sent to the calling line L1.

Before proceeding further with the description of the call from station TS1, it is advisable to explain the manner in which a tandem call originating at either the originating office OR or the switchboard SB is recognized and connected to a digit receiver DR. In this disclosure, a tandem call from office OR is referred to as a tandem I call and a tandem call from switchboard SB is referred to as a tandem II call. Both of these types of tandem calls are assumed to be directed to the called station CTS. When a tandem I call is extended over the trunk ORT to the incoming trunk circuit ITC1, an "off-hook" signal is sensed by the scanner S2 as set forth in the Doblmaier et al. disclosure. Subsequently, the central control CC interrogates the scanner S2 and reads-out an "off-hook" signal. It then consults the busy-idle information stored in the call store CS for each trunk circuit. Upon ascertaining that the trunk circuit ITC1 had been in the "on-hook" condition on the immediately preceding scan operation, the control CC concludes that an incoming call has been received and "updates" the busy-idle information for circuit ITC1 in the store CS. The control CC then uses its knowledge of the scanner address of the circuit ITC1 to refer to a translation facility in the program store PS which provides it with all of the service information it needs concerning circuit ITC1. Thereafter, control CC selects an idle digit receiver, such as receiver DR, for use on the call, and then searches for an available path from the trunk circuit ITC1 through the network TLN to the receiver DR. Upon finding such a path, the control CC sends orders to the network TLN to establish the appropriate switching connections. Subsequently, the central control CC sends orders via the incoming trunk circuit ITC1 to signal the office TO to commence outpulsing the digits required by the electronic switching office to establish the tandem call connections.

The manner in which a tandem II call is switched through the electronic switching office to a digit receiver is essentially the same as that just described with respect to the tandem I call and a description thereof as accordingly not repeated.

The operations that follow the establishment of connections to the digit receiver DR are essentially the same for a local customer call and for the tandem I and II calls. After the call connections to receiver DR have been established, the central control CC scans the calling lines and trunks every few milliseconds via the scanner S2 in a manner as set forth in Doblmaier et al. This scanning operation is performed to check both for the early abandonment of the call and for dial or TOUCH-TONE pulses. An abandoned call is signified by a prolonged "on-hook" condition on the line L1, trunk ORT, or trunk SBT and dial pulses are signified by periodic "on-hook" and "off-hook" conditions thereon. These conditions are sensed by the scanner S2 and read-out by the processor CP as described in Doblmaier et al. Each time the central control CC scans the calling line or trunk, it compares the present scanner reading with the immediately preceding one which is recorded in the call store CS. Whenever a disagreement is found by a comparison and the calling telephone is found to be "off-hook" on the next scanning operation, the control CC recognizes that a digit is being transmitted and adds one to the pulse count kept in the call store CS for the call. A digit is deemed complete when the calling line or trunk is "off-hook" and no momentary "on-hook" changes have been detected for a predetermined interdigital period.

In the case of the local customer call, when the central control CC received the first digit pulse transmitted from station TS1, it causes the dial tone transmission to that station to be interrupted as set forth in Doblmaier et al.

After the called office code portion of the called number has been received on the local customer call or any one of the tandem calls, the central control CC effects a translation of that code to obtain call routing, alternate routing and signaling information needed to complete the call to station CTS. In addition, the central control CC obtains information from the office code translation which indicates that a predetermined number of called station digits will be received. The routing information directs the central control CC to select an idle outgoing trunk circuit TC for use on the call. It also informs the central control CC that a digit transmitter DT is needed for outpulsing the digits required to complete the call connections through office TO to station CTS. Thereafter, the central control CC consults with the call store CS to ascertain the busy-idle status of both a transmitter DT and communication paths therefrom to the trunk circuit TC. If they are found to be idle, the central control CC commands the network TLN to interconnect the transmitter DT and the trunk circuit TC via two 4-stage paths (represented by the dotted lines in FIG. 1) and a wire junctor WJ. Next, the central control CC reserves an available communication channel through the switching network TLN or networks TLN and LLN between the calling line or trunk circuit and the outgoing trunk circuit appearance on network TLN. Thereafter, the control CC commands the signal distributor SD to activate a relay (not shown in FIG. 1) of the trunk circuit TC for switching that circuit into its so-called BYPASS state. In accordance with the present invention, this BYPASS state serves to connect the trunk circuit appearance A1 directly to the interoffice trunk IT and removes all inductor, capacitor and resistor devices of the trunk circuit from the established connections; thus, it provides a purely metallic path through the trunk circuit TC for outpulsing. Afterwards, a seizure signal is sent over the trunk IT to office TO and trunk continuity between the two offices is checked at transmitter DT in the conventional manner. Following the check, the office TO sends a "wink" signal to the electronic switching office as an indication for it to commence outpulsing.

As set forth in the Doblmaier et al. disclosure, the transmitter DT is arranged to accept "pulse start" and "pulse stop" signals from the central pulse distributor CPD. After a number of the called station digits has been received and stored in the call store CS, the central control CC commands the distributor CPD to send a "pulse start" to transmitter DT and thereby to commence the transmission of pulses of the correct electrical characteristics to office TO via the paths established through network TLN and the trunk circuit TC to trunk IT. The central control CC knows how many pulses are to be transmitted for each digit by virtue of the information it received from the store CS. After each pulse of a digit is outpulsed, it is monitored by the central control CC by way of either the scanner S2 or the digit receiver DR in order to determine when the digit pulsing should be terminated. The scanner S2 is used for the monitoring when the receiver DR is disconnected from the call connections in order to serve another call; otherwise receiver DR is utilized for the monitoring function. When the desired number of pulses has been transmitted, the central control CC by means of the distributor CPD transmits a "pulse stop" signal to transmitter DT for temporarily terminating digit outpulsing and initiating an interdigital timing period. When the latter period has elapsed, another "pulse start" signal from the distributor CPD again starts digit outpulsing by transmitter DT. This procedure is followed until all of the required call digits have been outpulsed to office TO.

Upon the completion of outpulsing, the supervision and the holding of the call connections toward the office TO are transferred from the transmitter DT to the scanner S2 which is connected to the call connections through the trunk circuit TC when the central control CC orders the distributor SD to switch circuit TC from its BYPASS state into its HOLD state. Connections between the transmitter DT and the trunk circuit TC and between the calling line and the digit receiver DR are then released and transmitter DT and receiver DR are made available for serving other calls. The call connections via the trunk link or trunk and line link networks TLN and LLN are established from the trunk circuit TC to either the calling line L1 in the case of a local customer call, or to the trunk circuit ITC1 in the case of a tandem I call, or to the trunk circuit ITC2 for a tandem II call while the trunk circuit is in the HOLD state. Shortly afterwards, orders from the central control CC cause the signal distributor SD to switch the trunk circuit TC from its HOLD state into the appropriate one of its three talking states each of which is used exclusively for serving a local customer call, a tandem I call, or a tandem II call. While in its talking state, the trunk circuit TC is arranged to provide call supervision connections from the scanner S2 toward the office TO for a local customer call and a tandem I or II call, as well as call supervision connections from scanner S1 to the calling line in the case of a local customer call. Call supervision is performed by the central processor CP in conjunction with the scanner S1 and S2.

While the office TO is utilizing the outpulsed digits to complete connections from the trunk IT to the called station CTS and then ringing that station, circuit TC is scanned every few milliseconds to determine when the called party answers. When the answer occurs, a reversal signal is sent from office TO over trunk IT. This reversal is sensed by scanner S2 via the trunk circuit TC and is used for changing the busy-idle information for trunk IT in the call store CS and to start charging operations for the call in the AMA equipment. The calling and called parties may then converse.

Thereafter, the trunk circuit TC is periodically scanned via the scanner S2 to detect when the call is terminated. After one of the parties replaces the telephone handset in its cradle, a call disconnect signal may be sensed by the scanner S2 and it is subsequently read-out by the central processor CP during the scanning operation. Processor CP then intiates a timing interval as a safeguard against a false "on-hook" signal. When the timing has been completed and assuming the calling line L1 or trunk ORT or SBT receives an "on-hook" signal first, the call connections from the line L1 or trunk ORT or SBT to the trunk circuit TC are released and disconnect supervision is returned to office TO. Scanner S2 and processor CP then await an "on-hook" supervision signal from the office TO and, upon its receipt, circuit TC is switched back to its IDLE state under control of the processor CP and the distributor SD.

Turning now to the test equipment TE and its functional association with the trunk circuit TC, it is noted that programmed information is stored in the central processor CP for periodically activating the trunk link network TLN to connect the test equipment TE to the apearance A1 of circuit TC so that routine maintenance and trouble measurements can be made. As a consequence, the network TLN is used as a trunk circuit test equipment connector and no special test connector circuit is required as in prior art systems. While the equipment TE and circuit TC are being interconnected, the processor CP may instruct the signal distributor SD to switch trunk circuit TC from its IDLE to its BYPASS state so that the measurements can be made over trunk IT. Such measurements can be made automatically by the equipment TE in the conventional manner while the trunk IT is open circuited at office TO or can be made with the aid of auxiliary equipment located at a maintenance area associated with trunk IT and office TO.

*Detailed description*

Referring now to FIG. 2, a detailed description is presented of the features and operations of an outgoing trunk circuit embodying features of the present invention. This trunk circuit is a switching circuit which provides an input communication path over leads T1 and R1 from the trunk link network TLN and an output communication path over leads T2 and R2 to the interoffice trunk IT. These paths are selectively interconnected within the trunk circuit by either purely metallic connections, which are used both for outpulsing digital information to the terminating office TO and for providing a talking path on tandem II from distant offices, or by different electrical networks comprising transformers, inductors, capacitors and resistors, which are used for voice communication on local customer calls and tandem calls from switchboards.

The transformers XT and XTA, as well as the capacitors C1 and C2 and the resistors RE1 and RE2 are employed for transmitting the voice frequency signals in each direction between the leads T1 and R1 and the leads T2 and R2. In addition, the transformer XT and capacitors C1 and C2: (1) isolate the D.C. circuit loops over leads T1 and R1 and the trunk IT, (2) impede the transmission of longitudinal noise signals over the tip and ring path through the trunk circuit TC, and (3) limit the current flow through that circuit which may be caused by lightning surges.

The windings W1 and W2 of the transformer XTA and the resistors RE1 and RE2 shunting those windings are serially connectable in circuit with the transformer XT and the capacitors C1 and C2 to reduce transmission variations by increasing the average value of return loss via the interoffice trunk IT when it is connected to a variety of incoming customer lines.

Inductor IA comprises the windings W3 and W4 which are individually connectable to leads T1 and R1 for providing a high impedance across these leads at voice frequencies to prevent the impairment of voice communication during calls. In addition, the windings W3 and W4 provide a low D.C. resistance from the leads T1 and R1 over the scan leads SL1 and SL2 to the Ferrod sensor FS1 of scanner S2 for enabling that sensor to sense "on-hook" and "off-hook" conditions on the calling telephone line.

Similarly, the inductor IB comprises the windings W5 and W6 which are individually connectable to leads T2 and R2 for providing a high impedance across these leads at voice frequencies and a relatively low D.C. resistance from leads T2 and R2 over scan leads SL3 and SL4 to the Ferrod sensor FS2 of scanner S2 for enabling that sensod to sense "on-hook" and "off-hook" conditions on the trunk IT. The diodes CR1 and CR2 are utilized for polarizing the current flow through Ferrod FS2 so that the supervisory battery reversals applied at office TO can be sensed by the Ferrod FS2.

Each of the Ferrods FS1 and FS2 is a sensing element which senses the presence or absence of current flow through the associated pair of the leads SL1–SL4. The presence of current in these leads represents an "off-hook" signal and the absence of current represents an "on-hook" signal. A Ferrod, as further described in the above noted Baldwin et al. application, comprises a rod of ferrite material around which are wound a pair of control windings. Each of these control windings is connected to a potential source, such as the negative potential 1 or ground 2, and to a scan lead such as lead SL1. In addition, each Ferrod comprises an interrogate winding (not shown) and a read-out winding (not shown) which are threaded through two holes (not shown) in the center of the ferrite rod. When current flows through the control windings, the ferrite rod is saturated and its incremental permeability approaches that of air. When no current flows through the control windings, the permeability of the rod is relatively high. This low-high permeability characteristic of the rod is utilized for enabling the device to sense "on-hook" and "off-hook" signals and for interrogating and reading out the stored signals. During the scanning operation, the central processor CP causes a pulse to be applied to the interrogate winding of a Ferrod and, if no current is flowing through its control windings, the pulse is coupled by transformer action to its read-out winding for indicating an "on-hook" signal. On the other hand, however, if current is flowing through the Ferrod control windings, the Ferrod is saturated and the interrogating pulse is essentially not coupled to the read-out winding to indicate an "off-hook" signal.

Trunk circuit TC also employs three magnetically latching relays designated A, B and C. These relays are operated over the leads LA–LC by the signal distributor SD and permit the trunk circuit TC to be switched into eight different switching states. All of the states are shown pictorially in FIG. 2A in accordance with principles set forth in the article entitled "The Map Method for Synthesis of Combinational Logic Circuits" by M. Karnaugh in the American Institute of Electrical Engineers Transactions, vol. 72, pages 593–599 of November 1953.

As shown in FIG. 2A, each of the relays A, B and C is assigned a weighting number 1, 2 and 4, respectively, and each of the eight switching states is represented by a numerical designation which is the sum of the relay weighting numbers. The relays A, B and C are initially released to place the trunk circuit TC in the IDLE state 0, while it is not engaged in serving a call. Thereafter, the relays are operated in a one-at-a-time basis to switch the trunk circuit into the next state required for serving a call. The ordered sequence in which the relays are operated is controlled by the programmed intelligence and is slightly different for a local customer call, a tandem call from another telephone office, and a tandem call from a switchboard.

Each of the operating circuits for relays A, B and C include a make contact A–1, B–1 or C–1 and a resistor RE4, RE5 or RE6, which shunts the winding of the relay when it is operated. One of the relays A, B or C is operated, as set forth in Doblmaier et al., when the signal distributor SD applies a momentary pulse potential to the associated one of the leads LA–LC and thereby completes the path through the relay winding to ground. Upon operating, the relay magnetically latches, or locks, its contacts in the actuated position and establishes the aforementioned shunt path around its winding to increase the current flow over the associated one of the leads LA–LC. The distributor SD detects this current increase and is thereby notified that the proper relay has been operated. An operated one of the relays A, B or C is released in response to a momentary pulse potential which is of opposite polarity to that of the operating potential.

Figure 1:
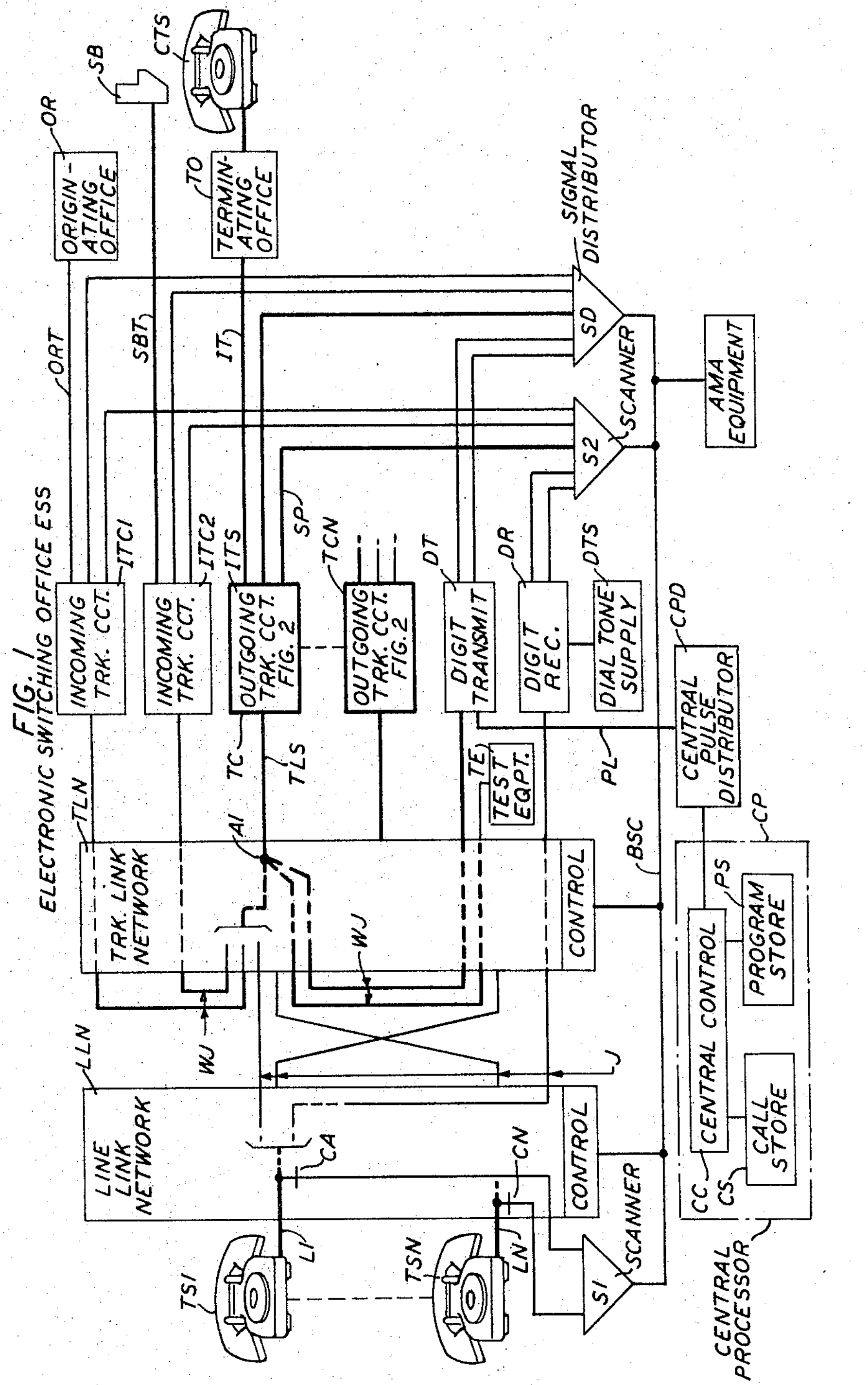
FIG. 1 is a block diagram of a program controlled telephone system employing an outgoing trunk circuit in accordance with our invention.

For the purpose of understanding the different sequences, a call from a local customer station such as station TS1 of FIG. 1 is classified as a local customer call, a call from another telephone office is classified as a tandem I call and a call from a switchboard is classified as a tandem II call. The following list indicates the typical sequences of states which the trunk circuit TC assumes for the three different types of calls. It is noted, however, that these sequences assume no trouble conditions, customer abandonment of calls, called line busy conditions and the like:

Local call: 0–4–6–2–3–2–0
Tandem I call: 0–4–6–2–3–1–0
Tandem II call: 0–4–6–2–3–7–3–2–0

In the IDLE state 0, the trunk link network TLN is disconnected from the transmission apparatus of the trunk circuit TC under control of the released relays A and C. The opened path is required to protect the Ferrod switching elements (not shown) of the network TLN against lightning surges, power crosses and similar electrical disturbances. In addition, the opened path is used to remove all networks of circuit TC from the leads T1 and R1 so that false cross and ground tests can be made as set forth in Doblmaier et al. When the trunk circuit TC is in the IDLE state 0, the resistor RE3 and capacitor C2 are connected via the contacts C–3, C–2 and A–2 to the leads T2 and R2 to provide both a prescribed impedance termination to the interoffice trunk IT to prevent "singing" on the trunk when voice frequency amplifier repeaters are associated therewith and, at the same time, an "on-hook" signal to the trunk IT.

The detailed operations of circuit TC can best be understood by describing the ordered sequences of relay operations that occur therein for serving the tandem I, tandem II and local customer types of calls. After such a call has been initiated and has progressed through the electronic switching office of FIG. 1 to the point where the central processor CP has connected the transmitter DT to the leads T1 and R1 of FIG. 2 in a manner as previously explained, the processor CP causes the signal distributor SD to effect the operation of relay C and thereby switch circuit TC from its IDLE state 0 to the BYPASS state 4. The latter state is used for connecting the transmitter DT to the interoffice trunk IT over a purely metallic path, that is, by means of the tip and ring leads T1, R1, T2 and R2 and relay contacts without any bridging or series impedances connected thereto. This BYPASS state enables the trunk link network TLN to be used as a transmitter-to-trunk circuit connector, as well as a talking path switching means, and thereby eliminates the need for a separate connector which has heretofore been required for the operation of prior art switching systems. A salient feature of this bypass facility is that no bridging or series trunk circuit impedances are connected to the tip and ring leads during the outpulsing operations and accordingly trunk losses within the trunk circuit are minimized during the outpulsing. The BYPASS state is established when the relay C operates, as previously explained, and interconnects both the leads T1 and T2 via the contacts A–3 and C–4 and the leads R1 and R2 via the contacts A–4 and C–5. Shortly thereafter, the transmitter DT commences the digit outpulsing to office TO in a manner as already described.

Before describing the circuit actions that occur upon the completion of outpulsing, it is advisable to explain that after the trunk IT has been engaged for serving a local customer call, a tandem I or a tandem II call, the office TO applies positive and ground potentials (not shown) over trunk IT to leads T2 and R2, respectively, to provide supervisory signaling between the electronic switching office ESS and office TO. Thereafter, a D.C. bridge is provided across the leads T2 and R2 by the transmitter DT via the trunk circuit TC and network TLN as set forth in Doblmaier et al. for both supervisory signaling and for holding office connections toward office TO.

Upon the completion of outpulsing, the processor CP effects the transfer of the holding of call connections toward office TO from transmitter DT to trunk circuit TC. Subsequently, the connections between the transmitter DT and circuit TC are released as previously explained. In order for circuit TC to hold the call connections, it is switched from its BYPASS state through its TRANSITION state 6 to its HOLD state 2. The processor CP controls this switching by ordering the distributor SD to operate relay B as already explained to establish the state 6 and then to release relay C as hereinbefore described. State 6 is used only for a transition from state 4 to state 2 and performs no other functional operations in this exemplary embodiment. In operating, relay B provides a D.C. bridge across the tip and ring leads T2 and R2 to furnish an "off-hook" signal to trunk IT and thereby hold the connections toward the office TO. This bridge is from the lead T2 through the winding W5, diode CR2, winding W6 and the contact B–2 to the lead R2. It is noted that the D.C. bridge is through diode CR2 rather than through diode CR1 and Ferrod FS2 because the diode CR2 is forward biased and the diode CR1 is reverse biased by the positive and ground potentials (not shown) applied in office TO over the trunk IT to the leads T2 and R2, respectively. The Ferrod FS2 is included in this path for sensing the reversal of the applied potentials on T2 and R2 when the called party answers and subsequently disconnects. The release of relay C opens the trunk circuit tip and ring leads toward the network TLN at contacts C–4 and C–5 and thereby switches circuit TC from its BYPASS state which persists during the transition to the HOLD state 2.

Shortly thereafter, the processor CP orders the networks LLN and/or TLN to establish connections from the calling line or trunk to leads T1 and R1 as set forth in Doblmaier et al. These connections are then checked for false crosses and ground under the control of the processor CP. After these checks are successfully completed, the processor CP orders the distributor SD to switch the trunk circuit TC into its talking state. Circuit TC has three different talking states: namely, TALK LOCAL state 3 for local customer calls, TANDEM I state 1 for calls from other originating offices, TANDEM II state 7 for calls from switchboards. Obviously, only one such state is established at any one time. For a local call, the distributor SD causes the operation of relay A as described to switch circuit TC from its HOLD to its TALK LOCAL state. In operating, relay A supplies talking potentials to the calling line by connecting potential 1 and ground 2 via the Ferrod sensor FS1 over the scan leads SL1 and SL2, windings W–3 and W–4, contacts B–3 and B–4, winding W1 and resistor RE1 in parallel, winding W2 and resistor RE2 in parallel, contacts C–6, C–7, A–5 and A–6 and the leads T1 and R1. The talking path through circuit TC toward the called station CTS is completed at the same time via the capacitor C1, winding W7, winding W8, capacitor C2, and the contacts C–2 and C–3 to the leads T2 and R2. The circuit TC then awaits for the called party answer signal from the office TO.

On a tandem I call, circuit TC is switched from the HOLD state 2 through the TALK LOCAL state 3 to the TANDEM I state 1 to provide an A.C. coupling path between the calling and called stations. After the relay A has been operated to establish the TALK LOCAL state 3 as explained, distributor SD proceeds to establish the TANDEM I state by releasing relay B. In releasing, relay B establishes the A.C. coupling path from the leads T1 and R1 through the contacts A–5, A–6, C–6, C–7, B–5 and B–6, capacitor C1, transformer XT, capacitor C2, and contacts C–2 and C–3 to the leads T2 and R2. The Ferrod FS2 is bridged across the leads T2 and R2 at this time for sensing the reversal signal from office TO when the called party answers. Ferrod FS2 is bridged across leads T2 and R2 via the leads SL3 and SL4, diode CR1, windings W5 and W6, and the contacts B–7, A–7 and C–2.

For a tandem II call, circuit TC is switched from the HOLD state 2 through the TALK LOCAL state 3 to the TANDEM II state 7 for providing a purely metallic path from appearance A1 to the interoffice trunk IT for the switchboard trunk SBT. These switching actions are accomplished by sequential orders from processor CP to the distribution SD to operate relay A and then relay C. In operating, relay C establishes the metallic path from lead T1 through contacts A–6, C–9 and C–4 to the lead T2 and from lead R1 through the contacts A–5, C–8 and C–5 to the lead R2. It is noted that the Ferrod FS2 is also bridged across the above traced path for the TANDEM II state via the leads SL3 and SL4, diode CR1, windings W5 and W6, and contact B–2 for sensing the called party answer signal from the office TO.

When a called party answers any of the aforementioned types of calls, the office TO reverses the potential (not shown) applied in office TO over the trunk IT to leads T2 and R2 and thereby completes a current path through the Ferrod FS2. This path is from leads T2 and R2 through the windings W5 and W6, and the now forward biased diode CR1 to the Ferrod FS2. The answer signal is subsequently read-out of the Ferrod FS2 as previously explained via the scanner S2 for causing the processor CP to change the call information in the call store CS for trunk IT and to initiate the charging operations in the AMA equipment in a manner as disclosed in Doblmaier et al. The calling and called customers may then converse.

Turning now to the circuit actions involved in switching the trunk circuit TC from its talking state to its IDLE state 0, it is noted that the actions are slightly different for each of the foregoing three types of calls. For the local call, the Ferrods FS1 and FS2 remain energized while the caller and called parts are conversing and are de-energized after a calling or called party disconnect. Ferrod FS1 is de-energized when the caller handset is replaced in its cradle and thereby opens the D.C. path between the leads T1 and R1. Ferrod FS2 is de-energized when the called party handset is replaced in its cradle and office TO removes the negative and positive potential (not shown) from the leads T2 and R2, respectively, via the trunk IT. Thereafter, the processor CP reads-out a "disconnect" signal from the de-energized Ferrod and orders the distributor SD to switch the circuit TC from the TALK LOCAL state 3 through the HOLD state 2 to the IDLE state 0 by first releasing the relay A and then relay B for restoring circuit TC to the condition in which it rested prior to the ogination of the call.

On a tandem I call, the Ferrod FS2 is de-energized as described previously after the calling party disconnects. Subsequently, during the scanning of the Ferrod FS2, the processor CP reads-out a "disconnect" signal and signals the distributor SD to switch the circuit TC from its TANDEM I state 1 to its IDLE state 0 by releasing relay A. In releasing, relay A opens its contacts A–5, A–6 and A–7 to open the trunk circuit connections over the leads T1, R1, T2 and R2 to the network TLN and trunk IT, respectively, and thereby signaling the offices ESS and TO to release the switching equipments utilized on the call. The circuit TC is then available for serving another call.

The Ferrod FS2 is also de-energized, as already described, after the calling party disconnects on a tandem II call. The processor CP thereafter reads-out a "disconnect" signal signal from Ferrod FS2 as explained Doblmaier et al. and orders the distributor SD to switch the circuit TC from its state 7 through the states 3 and 2 to the IDLE state 0 by first releasing relay C, then relay A, and finally relay B. In releasing, relay A opens its contacts A–5, A–6 and A–7 to disconnect the circuit TC from the network TLN and the trunk IT and thereby enables the call connections in offices ESS and TO to be released. The trunk circuit TC is then available for serving another call.

It is to be understood that the hereinbefore described arrangements are illustrative of the application of the principles of the present invention. In light of this teaching, it is apparent that numerous other arrangements may be devised by those skilled in the art without departing from the spirit and scope of the invention.

What is claimed is:

1. In combination, a communication station, a trunk circuit having a pair of input conductors, means for connecting said station to said conductors, said circuit further having an output pair of conductors and switching means responsive to the receipt of a first electrical signal for establishing metallic connections between said input and output conductors, and a digit transmitter for transmitting electrical digit signals to said input conductors for transmission to said output conductors, an electrical impedance network in said circuit, means responsive to a second electrical signal for connecting said network between said input and output conductors for transmitting alternating current signals therebetween, and means for opening said metallic connections between said input and output conductors when said network is connected therebetween.

2. A trunk circuit for a communication system comprising first and second pairs of communication paths, electrical impedance transmission networks, and switching means selectively operative for connecting said paths through said networks and alternatively establishing purely metallic connections between said paths.

3. A trunk circuit for a communication system comprising first and second pairs of trunking conductors, an electrical impedance network including capacitance means and a transformer connectable between said first and second pairs of conductors for transmitting alternating current signals therebetween, means connectable between said pairs of conductors for establishing metallic connections therebetween, and switching means responsive to the receipt of electrical signals for alternatively connecting said network and said establishing means between said pairs of conductors.

4. A trunk circuit for a communication system comprising a first and a second pair of trunking conductors, a pair of capacitors each one being individually connectable to one conductor of one of said pairs of conductors, a transformer having first and second two-terminal windings, one of said terminals of each of said windings being connected to one of said capacitors and the other one of said terminals of each of said windings being connectable individually to the other conductor of one of said pairs of conductors, and switch means responsive to the receipt of control signals for selectively bypassing said capacitors and transformer windings with direct current connections between said pairs of conductors.

5. A trunk circuit for a communication system comprising a first pair of trunking conductors, a first transformer having first and second two-terminal windings, one of said terminals of each of said windings being connectable to an individual one of said pair of conductors, a capacitor connected to the other one of said terminals of said first winding, a second transformer having first and second two-terminal windings, one of said terminals of said first winding of said second transformer being connected to said capacitor and the other one of said terminals of said last-mentioned winding being selectively connected to the other one of said terminals of said second winding of said first transformer, a second pair of trunking conductors, another capacitor connectable to one of said second pair of conductors and connected to one of said terminals of said second winding of said second transformer, the other one of said terminals of said second winding of said second transformer being connectable to the other one of said second pair of conductors, and switching means responsive to the receipt of a control signal for selectively establishing direct current connections from said first pair of conductors to said second pair of conductors.

6. A trunk circuit for a communication system in accordance with claim 5 wherein said switching means comprises an electromechanical switching device having contacts for disconnecting said first transformer windings from said first conductor pair as well as said other capacitor and second transformer from said second conductor pair, and other contacts for establishing metallic connections from said first pair of conductors to said second pair of conductors.

7. A trunk circuit for a communication system in accordance with claim 6, the combination further comprising another electromechanical switching device having contacts in parallel with each of said first transformer windings and being responsive to the receipt of an electrical signal for short circuiting said first transformer windings.

8. A trunk circuit for a communication system in accordance with claim 6, the combination further comprising means for supplying electrical potentials to said first pair of conductors and including a Ferrod having first and second two-terminal windings, first and second sources of potentials each being individually connected to one terminal of one of said Ferrod windings, and an inductor having first and second two-terminal windings, one terminal of each of said inductor windings being individually connected to the other terminal of one of said Ferrod windings and the other terminal of each of said inductor windings being individually connectable through one of said first transformer windings to one of said first pair of conductors.

9. A trunk circuit for a communication system in accordance with claim 6, the combination further comprising means for providing an idle circuit impedance termination between said second pair of conductors including said other capacitor and a resistor connectable in parallel with said second winding of said second transformer.

10. A trunk circuit comprising first and second communication paths, a plurality of scanning conductors, a plurality of control leads, switching means responsive to the receipt of electrical signals from said leads for connecting said conductors to said paths, and means including apparatus activated by said switching means for interconnecting said paths.

11. A trunk circuit in accordance with claim 10 wherein said switching means includes a relay having contacts and being responsive to said electrical signals received from said control leads for connecting said scan conductors through selected ones of said contacts to said paths, and said interconnecting means includes other ones of said contacts for establishing purely metallic interconnections between said first and second communication paths.

12. A trunk circuit in accordance with claim 10 further comprising a transformer-capacitance network, and wherein said switching means includes a relay having contacts and being responsive to other electrical signals received from said control leads for connecting said network between said first and second communication paths.

13. A trunk circuit in accordance with claim 12 further comprising a return-loss transformer, and additional contacts of said relay for serially connecting said return-loss transformer with said network between said first and second communication paths.

14. In a switching system, switch means operable for establishing communication connections, a trunk circuit having a first pair of conductors connected to said switch means and a second pair of conductors connectable to a trunk, a digit transmitter, a plurality of communication lines, control means responsive to the receipt of digits from said lines for operating said switch means to connect said transmitter to said first pair of conductors for transmitting digits thereto, connector means in said circuit activated by a control signal from said control means for establishing metallic connections from said first pair of conductors to said second pair of conductors for transmitting digits to said trunk, and means in said control means activated after the completion of said digit transmission for operating said switch means to connect said one line to said first pair of conductors.

15. In a switching system in accordance with claim 14, the combination wherein said trunk circuit further comprises termination devices serially connectable between the first and second conductors of said second conductor pair for providing a resistance termination therebetween, and switching apparatus activated by said control means for connecting said devices between said second pair of conductors prior to the connection of said one line to said first pair of conductors.

16. In a switching system in accordance with claim 15, the combination wherein said termination devices comprises a unidirectional current device and an inductor having a pair of windings connected in series with said device, and said switching apparatus comprising a relay having contacts for connecting said windings and device between said second pair of conductors.

17. In a switching system in accordance with claim 16, the combination further comprising a Ferrod and another unidirectional current device connected in parallel with said first-mentioned unidirectional current device for monitoring current reversals through said second pair of conductors.

18. In a switching system in accordance with claim 14, the combination wherein said trunk circuit further comprises an impedance network including capacitance means and a transformer connectable between said first and second pairs of conductors for transmitting alternating current signals therebetween, and switching circuitry activated by said control means for disengaging said established metallic connections and connecting said network between said first and second pairs of conductors.

19. In a switching system in accordance with claim 18, the combination further comprising a Ferrod connectable to said first pair of conductors for monitoring current variations through said first pair of conductors.

20. In a switching system in accordance with claim 19, the combination further comprising first and second sources of potentials, and an inductor having first and second windings connectable to said first pair of conductors; and wherein said Ferrod comprises a pair of two-terminal windings each of which is connected in series with one of said potential sources and one of said inductor windings.

21. In a switching system in accordance with claim 20, the combination wherein said trunk circuit further comprises an electromechanical switching device activated by said control means for connecting each of said inductor windings in series with one of said first pair of conductors.

22. In a switching system in accordance with claim 21, the combination wherein said trunk circuit further comprises another transformer having first and second windings, and said electromechanical switching device includes means for individually connecting each of said other transformer windings in series with one of said first pair of conductors and one of said inductor windings for controlling return losses.

23. In a switching system in accordance with claim 22, the combination wherein said other electromechanical switching device includes a magnetically latching relay having a two-terminal winding, one terminal being connected to a first control potential and the other terminal being connected over a lead to said control means, and further comprising means in said control means for applying a second control potential over said lead to said other terminal for causing current flow through said relay winding and thereby operate said relay, and a resistor connected to both said first control potential and a contact controlled by said relay for shunting said relay winding and thereby increasing the current flow over said lead as a signal to said control means that said relay was magnetically latched operated.

24. In a telephone system, a calling line, a data transmitter, a trunk circuit having input and output communication paths, means for supplying programmed signals for controlling the interconnection of said line and transmitter with said input path, a switching network responsive to selected ones of said signals for selectively connecting said line and said transmitter to said input path, and apparatus in said circuit responsive to other ones of said signals for selectively establishing communication connections including direct current connections from said input to output paths.

25. In a telephone system as set forth in claim 24, the combination further comprising test equipment, and wherein said switching network is also responsive to special ones of said programmed signals for connecting said equipment to said input path, and said apparatus comprises relay means activated by said other signals for establishing purely metallic connections between said input and output paths for said transmitter and equipment.

26. In a telephone system, telephone lines, a digit receiver, a line connector and a trunk connector each being operable for establishing connections between any one of said lines and said receiver, means for monitoring for a calling service request signal from any of said lines, common control means responsive to the receipt of a service request by said monitoring means for operating said connectors to establish connections between the calling line and said receiver, means controlled by said control means for storing digits, means for transmitting digits received in said receiver to said storing means, an outgoing trunk circuit having a pair of input conductors terminated at said trunk connector and a pair of output conductors connectable to an outgoing trunk, a digit transmitter, means in said control means responsive to the storage of digits in said storing means for operating said trunk connector to establish connections between said input conductors and said transmitter, switching means in said circuit activated by said control means for establishing metallic connections between said input and output conductors, a signal distributor controlled by said control means for activating said transmitter to transmit electrical signals via said connections through said trunk connector and said metallic connections to said trunk, an electrical impedance network in said circuit, means in said circuit activated by said control means for connecting said network between said input and output conductors, means in said control means for deactivating said switch means to open said metallic connections, and means in said control means for operating said line and trunk connectors to establish connections between said calling line and said input conductors.

27. Trunking equipment comprising a plurality of trunk circuits each comprising first and second communication paths, a plurality of control termini, and apparatus associated with said termini and operable for sequentially establishing a plurality of different electrical transmission networks including a direct current network between said paths; common control means for said circuits including program means for sequentially supplying instructions, and data processing means responsive to the receipt of said instructions for supplying electrical signals to said termini sequentially to operate said apparatus and thereby sequentially to establish each of said different networks.

28. Trunking equipment comprising a plurality of trunk circuits each having first and second communication paths, termini associated with said paths for receiving supervisory signals, a plurality of control termini, and apparatus associated with said control termini and operable for sequentially establishing a plurality of different electrical transmission networks including a direct current network between said paths, and common control means for said circuits responsive to the receipt of supervisory signals from said supervisory termini for applying electrical signals to said control termini sequentially to establish said different electrical networks.

29. Trunking equipment comprising a plurality of trunk circuits each having first and second communication paths, supervisory termini associated with said paths for receiving supervisory signals, a plurality of control conductors, and apparatus associated with said conductors and operable for sequentially establishing a plurality of different electrical transmission networks including a direct current network between said paths, and common control means for said circuits controllable by the receipt of supervisory signals from said supervisory termini for applying electrical signals to said conductors sequentially to operate said apparatus and thereby establish said different electrical networks.

30. Trunking equipment comprising a plurality of trunk circuits each having first and second communication paths, a plurality of supervisory termini each being individually connectable to one of said paths and connector means operable for both connecting said termini to said paths and for interconnecting said paths by purely metallic connections; and common control means for said circuits having means for generating command signals, means responsive to said command signals for operating said connector means of a selected one of said trunk circuits, and means associated with said termini of said one circuit to detect for the receipt of said supervisory signals; an electrical impedance network in each of said trunk circuits; means in said control means responsive to the receipt of a prescribed supervisory signal from said supervisory termini of said one circuit for further activating said connector means of said one circuit connecting said network between said first and second paths of said one circuit and opening the metallic connections therebetween.

31. In combination, functional switching equipment, a trunk circuit having a pair of input conductors, means for connecting said equipment to said conductors, said circuit further having an output pair of conductors, switching means responsive to the receipt of a first electrical signal for establishing metallic connections between said input and output conductors, an electrical impedance network, means responsive to a second electrical signal for connecting said network between said input and output conductors for transmitting alternating current signals between said equipment and said output conductors, and means for opening said metallic connections between said input and output conductors when said network is connected therebetween.

32. A trunk circuit for a common control telephone system comprising a plurality of magnetically latching relays activated by electrical pulse signals received over control leads from common control equipment in the telephone system, a first and a second pair of communication conductors, means responsive to sequential operation of said relays for establishing purely metallic connections between said pairs of conductors and for establishing distinct transmission network paths between said pairs of conductors, and means also responsive to said operation of said relays for establishing supervisory connections for the connections and paths thus established between said pairs of conductors.

33. In a switching system, switch means operable for establishing communication connections; an incoming trunk circuit having a first set of conductors connectable to an incoming trunk, a second set of conductors connected to said switch means, and means for establishing communication connections between said sets of conductors; an outgoing trunk circuit having input conductors connected to said switch means and output conductors connectable to an outgoing trunk; control equipment responsive to the receipt of service control signals in said incoming trunk circuit for operating said switch means to connect said second set of conductors to said input conductors; and means in said outgoing trunk circuit activated by a control signal from said equipment for establishing purely metallic connections between said input and output conductors and thereby completing communication connections between said incoming and outgoing trunks.

References Cited

UNITED STATES PATENTS

| | | | |
|---|---|---|---|
| 2,409,164 | 10/1946 | Taylor et al. | 179—18 |
| 2,756,382 | 7/1956 | Wuerth | 200—122 X |
| 2,803,706 | 8/1957 | Althouse | 179—18 |
| 3,268,669 | 8/1966 | Vigliante et al. | 179—27.02 |
| 3,283,082 | 11/1966 | Vigliante | 179—27.02 |

KATHLEEN H. CLAFFY, *Primary Examiner.*

L. A. WRIGHT, *Assistant Examiner.*